July 23, 1946.  L. M. PERSONS  2,404,455
CONTROL APPARATUS
Filed May 17, 1943  3 Sheets-Sheet 1
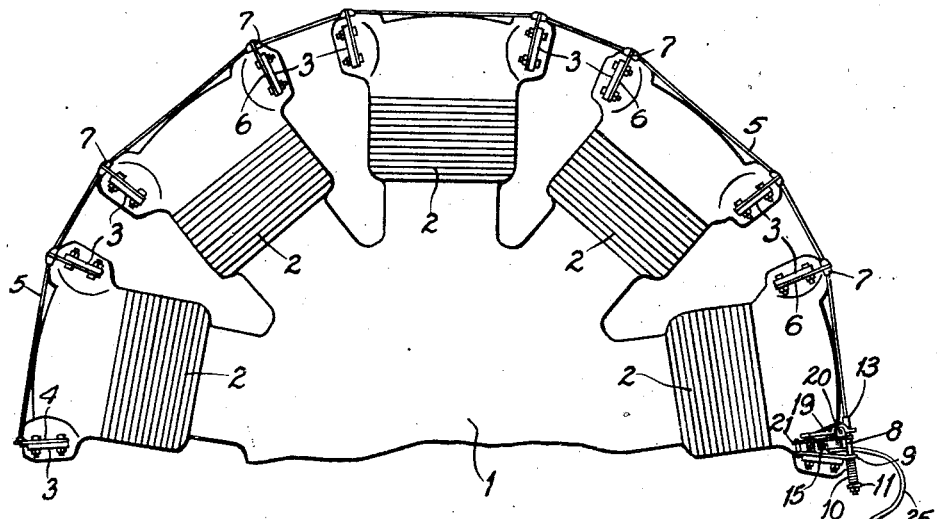
FIG. 1.
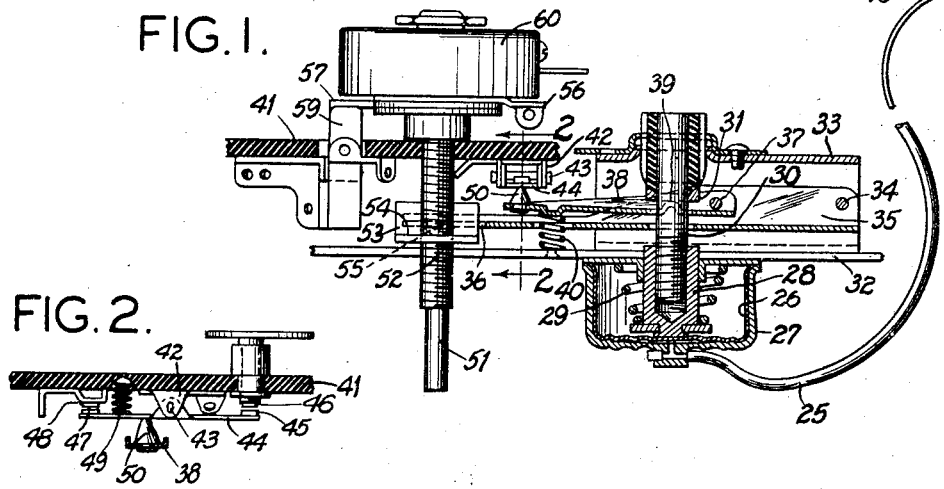
FIG. 2.
FIG. 3.
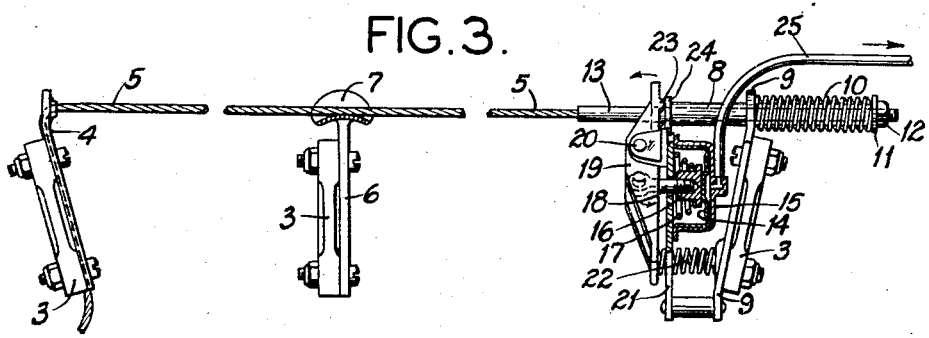
INVENTOR;
LAWRENCE M. PERSONS
BY
ATTORNEYS

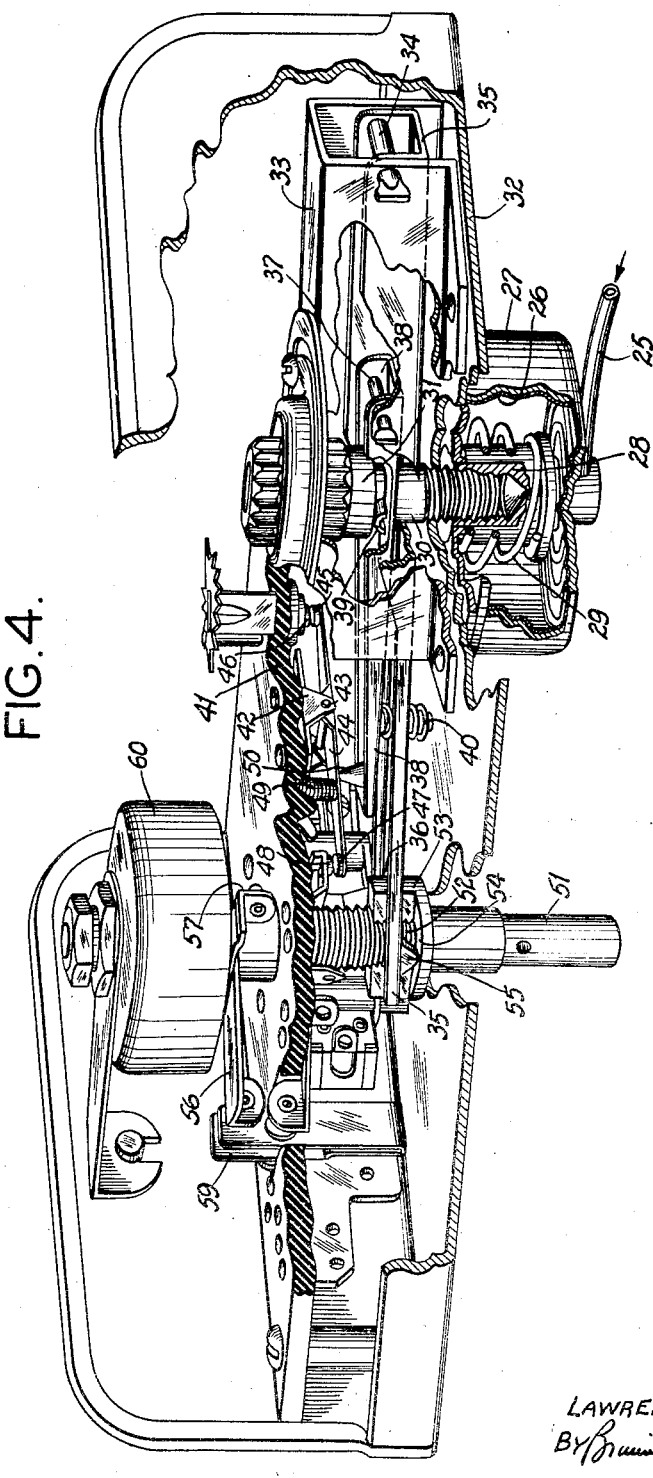

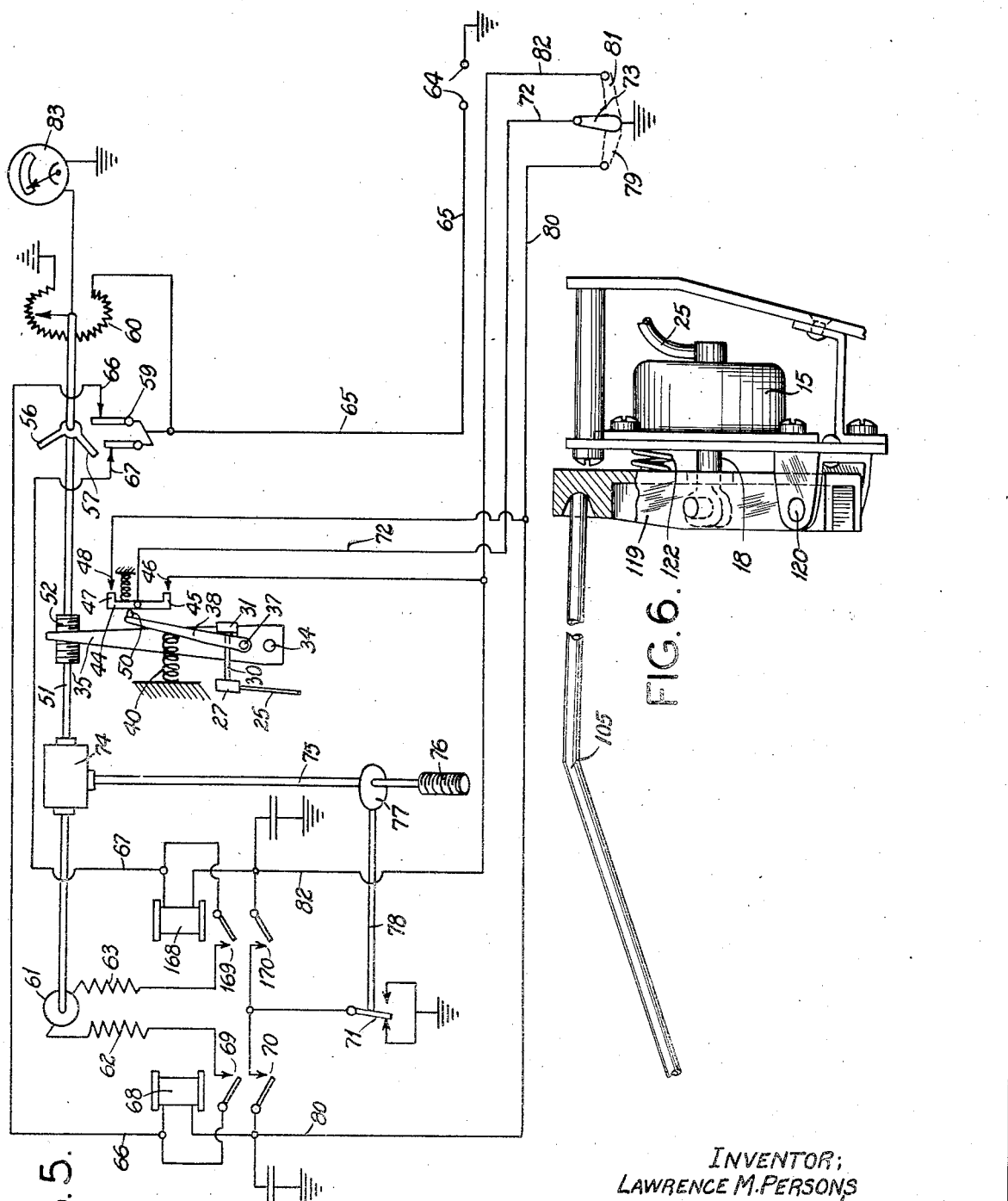

Patented July 23, 1946

2,404,455

UNITED STATES PATENT OFFICE 2,404,455

CONTROL APPARATUS

Lawrence M. Persons, Ladue, Mo., assignor to McQuay-Norris Manufacturing Company, St. Louis, Mo., a corporation of Delaware Application May 17, 1943, Serial No. 487,328

10 Claims. (Cl. 201—48)

This invention relates generally to automatic controls, and particularly to control apparatus responsive to changes in temperature of aircraft motors and adapted to regulate the cowl flaps thereof in accordance with increasing or decreasing temperature of the motor.

Heretofore a number of attempts have been made to automatically control the position of the cowl flaps on an aircraft motor in accordance with temperature, but the many variables which must be taken into account have tended to render such control apparatus unduly complicated and hence liable to get out of adjustment and difficult to maintain in operation.

The desirability of providing an automatic control system for such purpose which operates to change the position of the cowl flaps only during the period in which the temperature of the engine itself is either increasing or decreasing has heretofore been appreciated, but such systems as have been heretofore provided have not met with the degree of success which is required by the aircraft industry. One great difficulty has been to provide such a system which is immune to the vibration, sudden change of direction, and other mechanical strains to which a maneuvering aircraft will subject such an apparatus.

The object of the present invention, generally stated, is to provide an improved temperature control apparatus of the faltering type, adapted particularly for use on aircraft.

Another object of the invention is to provide a device for translating the temperature of an aircraft motor into a mechanical force for operating a faltering control switch.

Another object of the invention is to provide an integrated, compact, and reliable control mechanism embodying the faltering principle, whose operation accurately reflects increasing or decreasing temperature of the engine.

Other objects will become apparent to those skilled in the art when the following description is read in connection with the accompanying drawings, in which:

Figure 1 is a partial diagrammatic view of a radial type internal combustion engine provided with a temperature-sensitive element constructed in accordance with this invention, and associated therewith is an enlarged scale side elevation, part being shown in section, of a faltering type control switch constructed in accordance with the present invention;

Figure 2 is a sectional view taken along line 2—2 of Figure 1;

Figure 3 is a detail view showing the manner of connecting the parts of Figure 1 to the engine, and showing in detail part of the connections for translating the mechanical movement of the temperature-sensitive member to the faltering control switch;

Figure 4 is a perspective view, sections being broken away to reveal the relation of the parts of a faltering control switch of the character shown in Figure 1;

Figure 5 is a diagrammatic view of the control circuits utilized in accordance with one embodiment of the present invention; and Figure 6 is a view corresponding to Figure 3 but showing another embodiment.

In accordance with the present invention, a temperature-responsive control switch of the faltering type is provided. A control switch "faltering type," as the expression herein used, will be understood to be a switch which operates to close an electrical circuit during variation, either increase or decrease, of the controlling quantity such as temperature, but which operates to break such circuit when the variation has ceased to continue. In accordance with the present invention, such a faltering type switch involves the principle that when the contacts are closed due to a variation in the temperature, the apparatus set in motion by the completion of such an electrical circuit operates in such manner as to open the contacts. Thus, the apparatus is not subject to operating to an extreme position upon a minor variation in temperature and is not subject to hunting.

The present invention further contemplates a utilization of the lineal expansion of a number of parts of the internal combustion engine to actuate a switch arm in a degree proportional to the temperature variation of the engine.

Referring now to the drawings for an illustrative embodiment of the present invention, an air-cooled aircraft engine of the well-known radial type is shown at 1 and provided with a plurality of cylinders 2, each of which is provided with a pair of lugs 3 which may accommodate the usual rocker arm, in addition to the function served by them in connection with this invention. To one of the lugs 3 is provided a bracket 4 for anchoring a member 5, which has a different coefficient of lineal expansion from that of the engine 1. In the embodiment shown in Figures 1 and 3 such a member takes the form of a flexible cable, which may of course be constructed of materials which have a coefficient of lineal expansion approximating zero, but any coefficient of lineal expansion in substantial contrast with the coefficient of lineal expansion of the engine itself may be utilized when the apparatus is suitably coordinated. The lug 3 adjacent the other end of the member 5 is provided with a device, such as shown at the right end of Figure 3, for converting movement (relative to the engine 1) of the free end of the member 5 into movement of a fluid column, as will be later described. The intervening lugs 3 are provided with brackets 6, the extremities 7 of which are flared to provide a guideway for the member 5 and adapted to communicate to the member 5 any force resulting from radial growth of the cylinders 2 pursuant to temperature increases.

The free end of the member 5 is provided with a sleeve 8 passing freely through an aperture in bracket 9, which latter is connected to a lug 3. Beyond the bracket 9 (to the right as seen in Figure 3) a coil spring 10 surrounds the sleeve 8 and is held in position between the outward face of bracket 9 and a washer 11, held in position by a nut 12 suitably secured to the free end of the member 5 as through a stem 13 welded or otherwise fixed to the cable 5. The spring 10 thus operates to tension the member 5 in a direction such as to keep it seated in the guideway provided by the extremities 7 of bracket 6.

Mounted upon bracket 9 is a diaphragm 14 nested within a cup 15 so as to accommodate a small volume of fluid. A pressure member 16 is continuously biased against the inner face of diaphragm 14 by a spring 17, and the pressure member is connected by a pitman 18 to a lever 19 fulcrumed at 20 upon a bracket 21, which is fixedly supported by bracket 9. A spring 22 biases the lever 19 in a clockwise direction about fulcrum 20, as seen in Figure 3, i. e., counter to the effort of spring 17. The outer end of lever 19 is provided with a rounded portion 23 arranged to engage a shoulder 24 on sleeve 8 when the engine expands in such manner as to compress spring 10. This action moves the lever 19 in the direction indicated by the arrows, resulting in a reduction of the fluid content in the space between the diaphragm 14 and cup 15 and expulsion of some of that fluid through a capillary tube 25.

The other end of the capillary tube 25 is connected to actuate the faltering control switch of the present invention. To accomplish this, the tube 25 is connected to communicate with the space between a diaphragm 26 and a cup 27. A pressure member 28 engages the interior of cup 26 under the influence of a spring 29 in a well-known manner. The stem 30 extends upwardly from pressure member 28 and carries at its upper end an abutment 31. The position of abutment 31 with reference to pressure member 29 is adjustable by virtue of the threaded connection between stem 30 and pressure member 28. In the present embodiment the adjustability at this point is a manual adjustment for varying the temperature at which the engine 1 is intended to operate.

The arrangement just described is mounted upon a suitable frame 32 upon which is carried an auxiliary frame 33, which may of course be an integral part of frame 32. Transversing the auxiliary frame 33 is a shaft 34, upon which a control lever 35 is pivoted. The control lever 35, at the extremity opposite shaft 34, is bifurcated, as shown at 36. Transversing the lever 35 is a shaft 37, upon which is pivoted a second control lever 38. The lever 38 is provided with a bearing surface 39 for seating against abutment 31, and hence is urged downwardly at this point upon reduction in the amount of fluid contained in the space between diaphragm 26 and cup 27. A spring 40 is arranged to bias the lever 38 in the opposite direction and is seated upon frame 32 and extends through an aperature in lever 35.

A plate 41 is affixed to frame 32, or may be integral therewith, and upon the lower side of plate 41 may be mounted a bracket 42 having a shaft 43 rockably supporting a contact arm 44. The contact arm 44 is provided with a contact 45 at one end thereof (adapted to engage a stationary contact 46) and at the other end with a contact 47 (adapted to engage a stationary contact 48). One side of a power circuit is connected to contact bar 44 through or adjacent its fulcrum shaft 43, while the stationary contacts 46 and 48 are respectively connected to the other side of the power circuit for selectively energizing different circuits. A coil spring 49 is arranged to bias the contact arm 44 in a counter-clockwise direction, as seen in Figure 4, while an abutment 50 on the left end of the control lever 38 is arranged to engage the contact bar 44 and move the same against the force of spring 49.

Consequently, when the fluid content of the diaphragm 26 is reduced, the left end of control lever 38 is lowered, with the result that spring 49 biases contact bar 44 to close the circuit through contacts 45 and 46. This circuit is intended to initiate operation of a motor in one direction, while movement of the parts in the other direction to effect closure of a circuit through contacts 47 and 48 would initiate operation of the motor in the opposite direction. The motor referred to, it will be understood, is one for driving the screw jack or other suitable mechanism for varying the position of the cowl flaps, not shown, which control the flow of air across the cylinders of the engine, shown in Figure 1.

Mechanically connected to the motor, whose operation is controlled by contacts 45, 46, 47, and 48, is a shaft 51. The mechanical connection between shaft 51 and the operating motor may be through a suitable gear box so that, for example, thirty or more revolutions of the motor is required to turn shaft 51 one revolution. The shaft 51 is provided with a worm 52 upon which is mounted a follower 53. The follower 53 is provided with a shoulder 54, against which seats a bearing part 55 on control lever 35, so that rotation of shaft 51 effects a movement of control lever 35 about its pivot 34 directly in a clockwise direction but indirectly (through the action of spring 40) in the counter-clockwise direction.

Also mounted upon shaft 51 and rotatable therewith is a pair of arms 56 and 57, which are arranged to operate a limit switch 59. In the position of the parts shown in Figure 4 the arm 56 has engaged one side of the limit switch to open it. Upon revolution of the shaft 51 to an extent sufficient to bring arm 57 into engagement with the opposite side of limit switch 59, the latter will be opened. Normally, it will be understood, limit switch 59 maintains itself closed through its own resiliency.

On the other extreme upper end of shaft 51 is a potentiometer 60, which may be connected to an indicator so as to indicate at a remote point the angular position of shaft 51 and thereby indicate by relation the position of the cowl flaps at any time.

The application of power to diaphragm 26 through fluid from tube 25 will therefore be effective to permit control arm 38 to move in a clockwise direction about its pivot 37 under the influence of spring 40. This imparts a movement to contact bar 44 so as to effect a closure of contacts 47 and 48. Thereupon the operating motor rotates shaft 51 in a direction such as to raise the left end of control lever 35. This operation continues only until part 39 on control lever 38 re-engages abutment 31 and sufficient force is applied thereat to move the left end of control lever 38 downwardly against the force of spring 40, whereupon contacts 47 and 48 will open. If, however, the temperature of the engine continues to rise, the abutment 31 will be raised further so that greater upward movement of the left end of control lever 35 is required to disengage contacts 47 and 48. If there has been a sudden reversal of the force on the fluid column contained in tube 25, contacts 45 and 46 may be closed to effect operation of the motor in the opposite direction, and, consequently, reverse rotation of shaft 51, whereupon, under the influence of spring 40, the left end of control lever 35 will be moved downwardly, following collar 53, until abutment 59 has re-engaged contact arm 44 and moved the same against the action of spring 49 to an extent sufficient to separate contacts 45 and 46. Unless at this time the variation in temperature of the engine is still continuing in the same direction, movement of the parts will not be sufficient to close the opposite circuits through contacts 47 and 48.

In order that the operation of the apparatus herein disclosed may be more fully understood, reference may be had to the wiring diagram shown in Figure 5. Reversible motor 61, having field winding 62 and 63, is connected to be energized from a source 64, one terminal of which is connected to ground, as shown.

From the opposite side of source 64 a conductor 65 extends to limit switch 59 and thence in two directions through conductors 66 and 67. Conductor 66 is connected to the coil 68 of a relay, the opposite terminal of which is connected to stationary contact 48, which, when in engagement with contact 47, completes the circuit through contact bar 44 and conductor 72 to ground. In the embodiment illustrated, however, a manual switch 73 is provided to interrupt such ground connection when desired and render the operation of the apparatus manually controllable, as will be described hereinafter. Upon energization, relay 68 closes a circuit through contact 69 to effect energization of field winding 62 from conductor 66. The relay 68 is also provided with a contact 70, connected in circuit so that when the contact 70 is closed, relay 68 is connected direct to ground through an interrupter switch 71, which operates periodically to break the ground connection.

For energizing field winding 63 of motor 61 conductor 67 is connected through relay 168 and contacts 169, 170, 45, and 46 in the manner just described with reference to field winding 62.

With the circuit arrangement just described, it is apparent that when the circuit has once been closed to either of field winding 62 or 63 by operation of contact arm 44, the contact arm 44 and its adjunct contacts are shunted out by the making of the circuit through contact 70 and interrupter 71 to ground. As stated hereinbefore, however, the interrupter 71 operates periodically, as, for example, twice per revolution of motor 61, to break such shunt connection about contact arm 44. Accordingly, the movable contact arm 44, which, in the interest of sensitivity, is not adapted to make and break currents of the order required to operate motor 61, is thus protected, and the actual interruption of the current-energizing motor 61 is effected by interrupter switch 71.

In order to periodically operate interrupter switch 71, any suitable drive may be taken off the shaft of motor 61. As shown diagrammatically in Figure 5, a gear box 74 is provided to be driven by motor 61, and a drive shaft 75 extends therefrom for operating a jack screw 76 or other suitable mechanism for moving the cowl flaps. Mounted on shaft 75 and rotatable therewith is an oval cam 77 arranged to actuate a follower 78 and, in turn, interrupter switch 71 twice per revolution of shaft 75.

Also extending from gear box 74, and so reduced that less than one complete revolution thereof is accomplished throughout the limit of travel of shaft 75, is shaft 51 which carries, as hereinbefore described, worm 52, limit-switch operating-arm 56 and 57, and potentiometer 60.

In the event that the pilot should desire to deactivate the automatic control of motor 61 and to control it manually, switch 73 may be turned to the dotted line position shown at 79 to connect conductor 80 to ground, thereby shunting out control arm 44 and its adjunct contacts. On the other hand, if the pilot wishes to operate the motor 61 in the opposite direction, switch 73 may be turned in the position indicated in dotted lines at 81, whereby conductor 82 is connected to ground, thus shunting out contact arm 44. When, however, the pilot desires to reinstate the automatic control of motor 61, switch 73 may be moved back to the full line position as shown.

It will be understood that potentiometer 60 is suitably connected in a well-known manner to a potentiometer indicator 83, which may be conveniently arranged upon the dash or otherwise, as desired.

In the embodiment shown in Figures 1 and 3, a flexible cable is provided for communicating the thermal expansion of the engine 2 to the fluid column in tube 25. In that embodiment the flexible cable pulls on the outer end of lever 19. In Figure 6, however, the converse arrangement is shown, where, in lieu of flexible cable 5, a rod 105 of Invar steel, or other material whose coefficient of lineal expansion approximates zero (or, upon suitable coordination, having any coefficient of linear expansion in contrast with that of engine 1), is arranged to impart a pushing force on the outer end of lever 119. The lever 119 is connected to a pitman 18, as previously, but the fulcrum of lever 119 is arranged at 120, beyond the connection to pitman 18, while spring 122 is arranged between the pitman 18 and the connection to rod 105. It will thus be seen that relative expansion between the engine 1 and rod 105 will, through the mechanism just described, effect the same character of movement of pitman 18 as in the previous embodiment.

From the foregoing description those skilled in the art will readily understand the operation of the engine and appreciate that the energizing circuit for motor 61 is maintained only so long as the temperature of motor 1 continues to vary. Assume, for instance, that the temperature of engine 1 begins to increase, pitman 18 will move to the left, thus pulling fluid through tube 25 from diaphragm 26 and causing counter-clockwise movement of control lever 38, which, in turn, effects a closure of the circuit through contacts 45 and 46. This energizes relay coil 168 and effects a closure of contacts 169 and 170, but the circuit, through contacts 45 and 48, is simultaneously shunted through the interrupter switch 71. When rotation of motor 61 begins, the cowl flaps are slightly adjusted, and, concurrently therewith, the position of collar 52 is adjusted longitudinally of shaft 51 to vary the position of control arm 35, and, consequently, control arm 38 opens contacts 45 and 46. Once contacts 45 and 48 are open, the circuit can be maintained no longer than a half revolution of drive shaft 75. If, however, in the meantime the temperature of engine 1 has continued to rise another increment, the movement of collar 52 lengthwise of shaft 51 will be insufficient to break contacts 45 and 46. Until the temperature of engine 1 has quit rising, therefore, the circuit will be maintained. Upon cooling of the engine 1 operation in reverse will take place, as will be well-understood.

While the foregoing description and the accompanying drawings constitute a complete disclosure of one form of the invention, it is not to be understood that the invention is limited to the precise details described but that many variations, modifications, and alterations will readily suggest themselves to those skilled in the art, without departing from the spirit of the invention or the scope of the appended claims.

The invention having thus been described, what is claimed is:

1. A control apparatus comprising, a frame, a temperature-responsive member adapted to move relative to the frame in accordance with the temperature of a machine being controlled, a power-driven element, a main lever pivoted on the frame and connected to follow said power-driven element, a second lever pivoted on the main lever and arranged to follow movements of said temperature-responsive member, a plurality of stationary contacts, and a switch bar centrally mounted on said frame to selectively engage said stationary contacts in accordance with the position of said second lever.

2. A control apparatus comprising, a frame, a temperature-responsive member adapted to move relatively to the frame in accordance with the temperature of a machine being controlled, a rotatable power-driven shaft, a main lever pivoted on said frame, connections between said shaft and said main lever for causing said lever to move longitudinally of the shaft as the shaft rotates, a second lever pivoted on the main lever and arranged to follow movements of said temperature-responsive member, a plurality of stationary contacts, and a switch bar centrally mounted on said frame to selectively engage said stationary contacts in accordance with the position of said second lever.

3. A control apparatus comprising, a frame, a temperature-responsive member adapted to move relatively to the frame in accordance with the temperature of a machine being controlled, a rotatable power-driven shaft, a main lever pivoted on said frame, connections between said shaft and said main lever for causing said lever to move longitudinally of the shaft as the shaft rotates, a second lever pivoted on the main lever and arranged to follow movements of said temperature-responsive member, a plurality of stationary contacts, a switch bar centrally mounted on said frame to selectively engage said stationary contacts in accordance with the position of said second lever, and limit switch actuating means on said shaft and rotatable therewith.

4. A control apparatus comprising, a frame, a temperature-responsive member adapted to move relatively to the frame in accordance with the temperature of a machine being controlled, a rotatable power-driven shaft mechanically connected to the part to be controlled, a main lever pivoted on said frame, connections between said shaft and said main lever for causing said lever to move longitudinally of the shaft as the shaft rotates, a second lever pivoted on the main lever and arranged to follow movements of said temperature-responsive member, a plurality of stationary contacts, a switch bar centrally mounted on said frame to selectively engage said stationary contacts in accordance with the position of said second lever, limit switch actuating means on said shaft and rotatable therewith, and a potentiometer on said shaft.

5. A control apparatus comprising, a frame, a temperature-responsive member adapted to move relative to the frame in accordance with the temperature of a machine being controlled, a power-driven element, a main lever pivoted on the frame and connected to follow said power-driven element, a second lever pivoted on the main lever and arranged to follow movements of said temperature-responsive member, a plurality of stationary contacts, and a switch bar pivoted to said frame intermediate its ends and having a contact at one end for engagement with one stationary contact and a contact at the other end for engagement with another stationary contact, said switch bar being arranged to move about its pivot in accordance with movement of the free end of said second lever.

6. A control apparatus comprising, a main lever mounted for movement in response to a force applied thereto by a power means, a second lever pivoted on the first lever and arranged to move in response to force applied by a second power means, a movable contact bar mounted independently of said levers arranged to follow a portion of said second lever which is influenced by both power means, and stationary contacts for selective engagement with said contact bar.

7. Apparatus for controlling the temperature of internal combustion engines constructed of thermally expansible material, comprising a substantially inexpansible member having one end fixed to part of the engine and the other end free to move relative to a remote point on the engine, means mounted upon the engine adjacent said remote point and movable in response to relative movement between the free end of said member and said remote point on the engine, a switch member, means for transmitting movement of said means to said switch member in proportion of degree to move the switch member, and other means acting on said switch member to move the same.

8. Apparatus for controlling the temperature of radial internal combustion engines of thermally expansible material, comprising a substantially inexpansible member embracing a plurality of cylinders of the engine, means on each cylinder for imparting a radial force to said member as the engine expands radially, mechanical follow-up means, one end of said inexpansible member being fixed against movement relative to said engine and the free end thereof being connected to said mechanical follow-up means to close an electrical circuit only while relative movement between the engine and the free end of said member is taking place.

9. Apparatus for controlling the temperature of radial internal combustion engines of thermally expansible material, comprising a substantially inexpansible rod embracing a plurality of cylinders of the engine, means on each cylinder for imparting a radial force to said member as the engine expands radially, mechanical follow-up means, one end of said inexpansible member being fixed against movement relative to said engine and the free end thereof being connected to said mechanical follow-up means to close an electrical circuit only while relative movement between the engine and the free end of said member is taking place.

10. Apparatus for controlling the temperature of radial internal combustion engines, comprising a flexible cable embracing a plurality of cylinders of the engine, means on each cylinder for imparting a radial force to said member as the engine expands radially, mechanical follow-up means, one end of said inexpansible member being fixed against movement relative to said engine and the free end thereof being connected to said mechanical follow-up means to close an electrical circuit only while relative movement between the engine and the free end of said member is taking place.

LAWRENCE M. PERSONS.